Patented July 11, 1950

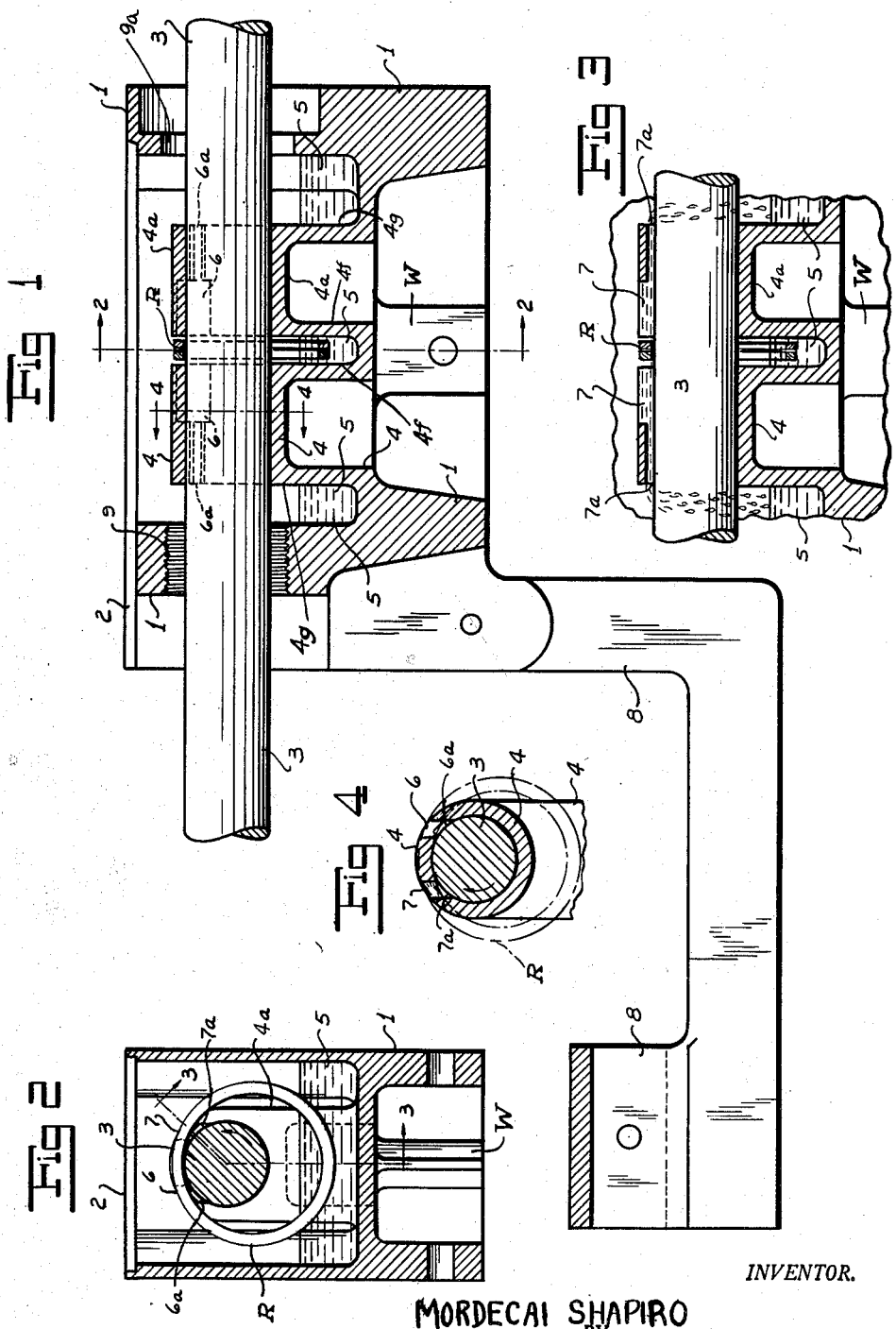

2,514,903

UNITED STATES PATENT OFFICE 2,514,903

LUBRICATING MEANS

Mordecai Shapiro, Merrick, N. Y.

Application March 5, 1948, Serial No. 13,235

14 Claims. (Cl. 308—128)

My invention relates to new and improved lubricating means, for lubricating the bearings of a rotating shaft which is rotated either clockwise or counterclockwise.

According to my invention, the bearings are cast integrally by a die-casting process with the housing in which said bearings are located, thus greatly decreasing the cost of manufacture and assembly.

Other objects and advantages and features of my invention are stated in the annexed description and drawings, which illustrate a preferred embodiment thereof.

Fig. 1 is a vertical section, partially in elevation, of the improved device.

Fig. 2 is a transverse section on the line 2—2 of Fig. 1.

Fig. 3 is a detail section, partially in elevation, on the line 3—3 of Fig. 2.

Fig. 4 is a transverse section on the line 4—4 of Fig. 1.

The bearings 4 and 4a are cast integrally with the housing 1. Said housing 1 has a conventional recess 2 at its top, for receiving a cover which is not shown.

The inner cylindrical faces of the bearings 4 and 4a have a common longitudinal axis, which is coincident with the longitudinal axis of the rotatable shaft 3. For convenience, it is assumed that this longitudinal axis is horizontal. The device is preferably used while such longitudinal axis is horizontal.

The bearings 4 and 4a have proximate vertical, planar, transverse faces 4f, which are longitudinally separated. Said bearings 4 and 4a also have remote transverse faces 4g, which are also vertical and planar. These transverse faces 4f and 4g are perpendicular to the longitudinal axis of shaft 3.

These bearings 4 and 4a are identical.

At their proximate transverse faces 4f, each said bearing 4 and 4a has two top oil-grooves 6 and 7 which are circumferentially spaced from each other. These oil-grooves 6 and 7 are at opposite sides of a vertical plane in which the axis of shaft 1 is located. Each oil groove 6 and 7 extends through the top face of the respective bearing 4 or 4a and also through its inner cylindrical bearing-face, so that if lubricating oil is forced into the open top of an oil-groove 6 or 7, such oil will flow through its open bottom, to contact with the shaft 3.

Each said bearing 4 and 4a thus has a portion which has a longitudinal, cylindrical outer face, which is located between depending vertical and transverse walls which are spaced longitudinally from each other. These depending walls are cast integral with the bottom wall of housing 1 and they form integral parts of the bearings. At the proximate transverse faces 4f of said bearings 4 and 4a, said depending walls are integral with a web W which is integral with the bottom wall of the housing 1.

Said depending walls have longitudinal faces which are vertical and planar and which are spaced transversely inwardly from the longitudinal walls of housing 1. These longitudinal faces of said depending walls are parallel to the axis of shaft 3.

If oil is poured into the housing 1 to provide an annular oil-pool 5, said oil-pool 5 surrounds said depending walls 4g and a part of said oil-pool 5 is located in the space between said depending walls at the proximate faces 4f of said bearings, so that said space is always supplied with oil for the oil-rings R.

At their remote ends, the two oil-grooves 6 communicate with two respective longitudinal oil-channels 6a, and the two oil-grooves 7 communicate with two respective longitudinal oil-channels 7a. Each said oil-channel 6a, 7a is closed at its top. Each said oil channel 6a and 7a is open at its bottom, where it extends through the respective inner cylindrical bearing face. Each said oil-channel 6a and 7a is open at both ends thereof, so that each oil-channel has a port in a respective edge-face of the respective bearing.

The respective oil-grooves 6 and their respective oil-channels 6a of the bearings 4 and 4a are longitudinally alined, so that if oil is forced into the two respective oil-grooves 6a, said oil will flow longitudinally in respective opposed longitudinal directions, through and longitudinally out of the respective oil-channels 6a.

The respective oil-grooves 7 and their oil-channels 7a are similarly longitudinally alined, as shown in Fig. 3. The oil which is located in the oil-grooves 6 and the oil-channels 6a, also contacts with shaft 3, so that the rotating shaft 3 picks up the oil along the entire length of each bearing 4 and 4a, whereby a continuous film or bath of oil is provided between the entire inner cylindrical faces of the bearings 4 and 4a and the respective parts of the rotating shaft 3.

I provide two oil-rings R on the shaft 3, in the space between the proximate faces of the bearings 4 and 4a. While I can use one oil-ring, I greatly prefer to use two oil-rings. Each oil-ring R has concentric inner and outer circular faces and planar transverse faces. Each oil-ring is of the same width, as measured along the axis of shaft 3. These oil-rings R are longitudinally slidable on shaft 3 in the space between the proximate faces of bearings 4 and 4a, and shaft 3 can rotate relative to oil-rings R.

These oil-rings R dip into the respective part of the oil-pool 5. When the shaft 3 is rotated in either direction, as at 1200 revolutions per minute, the oil-rings R are rotated by said shaft 3 in the usual manner in the same direction as shaft 3, thus raising oil from the pool 5 and sending the oil into either the oil-slots 6 to flow longitudinally out of the oil-channels 6a, or into the oil-slots 7 to flow longitudinally out of the oil-channels 7a.

If the shaft 3 is turned clockwise, as indicated by the arrow in Fig. 4, the oil which is picked up by the rotating oil-rings R will fill the oil-slots 7 and flow longitudinally out of oil-channels 7a, and little or no oil will be sent into the oil-slots 6.

If the shaft 3 is turned counterclockwise as viewed in Fig. 4, the picked-up oil will fill the slots 6 and flow longitudinally out of oil-channels 6a and little or no oil will enter the oil-slots 7. The picked-up oil fills the oil-channels 6a or 7a, thus lubricating the respective parts of the shaft 3.

As shown in Figs. 2 and 4, the oil-channels 6a and 7a, which are identical, have planar longitudinal walls which are inclined 45° to the vertical plane. The planar longitudinal walls of oil-channels 7a and the planar longitudinal walls of oil-channels 6a are inclined away from the median vertical plane of shaft 3, in which its longitudinal axis is located.

I have found by experience that two oil-rings R are much superior to a single oil-ring, although my invention includes the use of a single oil-ring R in the same location as the two oil-rings R.

If I use a single oil-ring R, this single oil-ring tends to move longitudinally towards the respective proximate face of bearing 4 or 4a, even if the shaft 3 is truly horizontal. The shaft 3 is often not truly horizontal. In such case, a single oil-ring R moves towards its lower bearing. I prefer to use a heavy lubricating oil, such as No. 70 according to the standards of the Society of Automotive Engineers. I prefer that the tops of the oil-rings R should extend substantially to the tops of the bearings 4 and 4a. Under such conditions, the film of oil at the top of shaft 3 which is located between the proximate faces of bearings 4 and 4a, keeps said oil-rings R longitudinally separated, so that each oil-ring R remains close to the proximate end of the respective bearing, thus keeping the oil-grooves 6 or 7 filled with oil, depending upon the direction of rotation of shaft 3.

I prefer to close the oil-channels 6a and 7a, save at their longitudinally alined ends and at the cylindrical bearing faces of the bearings in order to provide a reliable longitudinal flow of oil through said oil-channels.

With respect to the median vertical plane, the longitudinal walls of the oil-channels are inclined oppositely to the respective direction of movement of the cylindrical surface of shaft 3. This angle is not limited to 45°.

In some installations, the shaft 3 is turned in only one direction, as the clockwise direction indicated in Fig. 4. In such case, I can omit the oil-grooves 6 and their oil-channels 6a.

As one practical example, to which the invention is not limited, the following is disclosed:

The diameter of shaft 3 is 0.875 inch and it is rotated at 1200 revolutions per minute. The length of the cylindrical bearing face of each bearing, as measured along the axis of shaft 3, is 1.375 inches. The length of the space between the proximate faces of said bearings is 0.31 inch. The weight of each oil-ring R is 0.5 ounce. Its external diameter is 1.875 inches and its internal diameter is 1.375 inches. The width of each oil-slot 6 and 7, measured transversely to the axis of shaft 3, is 0.18 inch and its length is 0.69 inch. The width of each oil-channel 6a and 7a is 0.18 inch and its depth is 0.06 inch. The clearance between shaft 3 and the cylindrical bearing faces is 0.06 inch.

The shaft 3 extends through openings in the end-walls of housing 1. Said openings are optionally closed in any suitable manner, while permitting the free rotation of shaft 3. Such means are conventional and are not shown. One of said side-wall openings is designated by the reference numeral 9. After the casting has been made, the wall of said opening can be provided with a thread, in order to receive a threaded closure plug.

I have disclosed a preferred embodiment of my invention, but numerous changes, omissions and additions can be made without departing from its scope, and the scope of the invention also includes sub-combinations of the complete combination disclosed herein. For convenience, the claims refer to the horizontal position of shaft 3. I can provide more than two bearings for shaft 3, and using only a single bearing.

For convenience, some of the terms used in the claims are defined as follows:

Each oil-groove 6 or 7 and its associated oil-channel 6a or 7a is an oil-passage. In the specific embodiment disclosed herein, the oil-grooves 6 and 7 are the proximate portions of said oil-passages and the oil-channels 6a and 7a are the remote portions of said oil-passages. Each proximate portion 6 and 7 is transversely open at the outer face of the respective bearing. Each remote portion 6a and 7a is transversely closed at a longitudinal end-wall which is spaced transversely inwardly from the outer face of the respective bearing.

The longitudinal side-walls of the oil-channels or remote portions 6a and 7a are inclined to the longitudinal side-walls of the oil-grooves or proximate portions 6 and 7. As shown in Fig. 2, each side-wall of each oil-groove 6a or 7a makes an angle of less than 180° with the respective oil-groove, as referred to the vertical median plane. Each longitudinal side-wall of each oil-channel 6a or 7a has a greater inclination to said vertical median plane than the longitudinal side-walls of the oil-grooves 6 and 7.

Each oil-groove 6 and 7 has planar and parallel longitudinal side-walls which are parallel to the longitudinal axis of shaft 3, and each oil-channel 6a and 7a has planar and parallel longitudinal side walls which are parallel to said longitudinal axis.

I claim:

1. A lubricating housing which has a bottom wall, longitudinal walls and end-walls, said bottom wall being integral with bearings which are located above said bottom wall, said bearings having internal cylindrical bearing faces which have a common horizontal and longitudinal axis, said bearings having proximate end-faces which are longitudinally separated, said bearings also having remote end-faces which are longitudinally opposed to said proximate end-faces, a rotatable shaft extending through said internal bearing faces, said shaft having an exposed portion between said proximate end-faces, oil-ring means supported at the top of said exposed portion, each said bearing having two circumferentially spaced and substantially longitudinal oil-passages which open into said proximate end-faces and into said remote end-faces, said passage of each bearing being located transversely at opposite sides of a vertical plane in which said axis is located, said oil-passages also opening into said internal bearing faces.

2. A lubricating housing according to claim 1, in which each said oil-passage has a proximate portion at a respective proximate end-face and a remote portion at a respective remote end-face, each said proximate portion being also transversely open at the respective outer face of the respective bearing, each said remote portion having a longitudinal end-wall which is spaced transversely inwardly from the respective portion of the outer face of the respective bearing.

3. A lubricating housing according to claim 1, in which each said oil-passage has a proximate portion at a respective proximate end-face and a remote portion at a respective remote end-face, each said proximate portion being also transversely open at the respective outer face of the respective bearing, each said remote portion having a longitudinal end-wall which is spaced transversely inwardly from the respective portion of the outer face of the respective bearing, each said proximate portion and each said remote portion having longitudinal side-walls, the longitudinal side-walls of said remote portions being inclined to said vertical plane and having a greater inclination to said vertical plane than said side-walls of said proximate portions, the angle between said longitudinal side-walls of each said proximate portion and the respective remote portion being less than 180° with respect to said vertical plane.

4. A bearing which has an internal cylindrical bearing face and end-faces, said bearing face having a longitudinal axis, said bearing having a longitudinal oil-passage which extends through said end-faces and which communicates with said internal cylindrical bearing face, said oil-passage having a transversely open part which extends into the outer face of said bearing at one said end-face, said oil-passage having a transversely closed part which has a longitudinal end-wall at said other end-face which is spaced transversely inwardly from the respective part of the outer face of said bearing.

5. A bearing according to claim 4, in which said oil-passage is spaced transversely from a plane in which said longitudinal axis is located, said plane being vertical when said longitudinal axis is horizontal.

6. A bearing according to claim 4, in which said oil-passage is spaced transversely from a plane in which said longitudinal axis is located, said plane being vertical when said longitudinal axis is horizontal, said oil-passage having longitudinal side-walls, said longitudinal side-walls of said transversely closed part being inclined to the longitudinal side-walls of said transversely open part at an angle of less than 180°, said side-walls of said transversely closed part having a greater inclination to said plane than said side walls of said transversely open part.

7. A lubricating housing according to claim 1, in which said oil-ring means comprises two separate oil rings which are slidable on said exposed portion.

8. A lubricating housing which has a bottom wall and two upstanding bearings which are integral with said bottom wall, said bearings having a common horizontal longitudinal axis, each said bearing having a proximate upstanding wall and a remote upstanding wall which are integral with said bottom wall, said proximate walls being longitudinally spaced from each other, said housing being shaped to provide an oil space between said proximate walls, below the internal faces of said bearings, each said bearing having two oil-grooves at its respective proximate face, said oil-grooves being open at their tops and bottoms, said oil-grooves being located substantially at the top of the respective bearing and at opposite sides of a vertical plane in which said axis is located, each oil-groove having an oil-channel extension which has a port in the respective remote wall, each said oil-channel extension being closed at its top and open at its bottom, and receiving means for receiving lubricant which emerges from said ports and returning said lubricant to said oil space.

9. A lubricating housing according to claim 8, in which said housing also has outer end-walls between which said bearings are located, and said receiving means are spaced between said respective outer end-walls and said respective remote walls.

10. A lubricating housing according to claim 8, in which said oil-grooves and said oil-channel extensions are substantially longitudinal.

11. A lubricating housing according to claim 8, in which said oil-grooves and said oil-channel extensions are substantially longitudinal, said oil-grooves having substantially vertical longitudinal walls, said oil-channel extensions having longitudinal walls which are inclined substantially 45° to the said vertical plane.

12. A lubricating housing which has a bearing which has a longitudinal and substantially horizontal axis, said bearing having a longitudinal wall which has respective edge-faces, said longitudinal wall having an oil-groove at one of said edge faces, said oil groove being located substantially at the top of said longitudinal wall and being circumferentially offset from a vertical plane in which said axis is located, said oil-groove being open at its top to receive lubricant and being open at its bottom to communicate with the interior of said bearing, said oil-groove having an oil-channel extension which extends towards the other edge-face and which has an outlet port in said other edge-face, said oil-channel extension being closed at its top and being open at its bottom to communicate with the interior of said bearing.

13. A lubricating housing according to claim 12, in which said oil-groove and said oil-channel extensions are substantially longitudinally disposed.

14. A lubricating housing according to claim 12 in which said oil-groove and said oil-channel extensions are substantially longitudinally disposed, the walls of said oil-groove being substantially vertical, the walls of said oil-channel extension being inclined substantially 45° to said vertical plane.

MORDECAI SHAPIRO.

REFERENCES CITED

The following references are of record in the file of this patent:

UNITED STATES PATENTS

| Number | Name | Date |
|---|---|---|
| 626,715 | Norton | June 13, 1899 |
| 1,368,998 | Barr | Feb. 22, 1921 |

FOREIGN PATENTS

| Number | Country | Date |
|---|---|---|
| 86,898 | France | Sept. 24, 1919 |